United States Patent [19]
Melamed et al.

[11] 3,975,694
[45] Aug. 17, 1976

[54] SELF Q-SWITCHED LASER

[75] Inventors: Nathan T. Melamed, Pittsburgh; Kenneth B. Steinbruegge, Murrysville, both of Pa.

[73] Assignee: Westinghouse Electric Corporation, Pittsburgh, Pa.

[22] Filed: Feb. 19, 1974

[21] Appl. No.: 443,888

[52] U.S. Cl. .................. 331/94.5 Q; 331/94.5 C; 331/94.5 T
[51] Int. Cl.² .................. H01S 3/10; H01S 3/08
[58] Field of Search .................. 331/94.5; 330/4.3

[56] References Cited
UNITED STATES PATENTS
3,407,294   10/1968   Hill .................. 331/94.5 C
3,803,509   4/1974   Steffen .................. 331/94.5 P FOREIGN PATENTS OR APPLICATIONS
1,564,637   12/1969   Germany .................. 331/94.5
1,564,651   4/1970   Germany .................. 331/94.5

OTHER PUBLICATIONS
Anan'ev, Soviet J. of Quantum Electronics, vol. 1, No. 6, May–June, 1972, pp. 565–586.

Primary Examiner—Robert J. Webster
Attorney, Agent, or Firm—R. M. Trepp

[57] ABSTRACT

An improved self Q-switching $Nd-UO_2$-glass laser is provided in which a diffusing medium is included, either within the laser rod or externally thereof to increase the effective volume of the laser rod. Various diffusing means are disclosed including optical inhomogeneities, diffusion coatings, and curvilinear resonators.

12 Claims, 4 Drawing Figures

SELF Q-SWITCHED LASER

GOVERNMENT CONTRACT

The invention herein described was made in the course of or under U.S. Contract AF 33(615)3665.

FIELD OF THE INVENTION

The present invention relates to Q-switching lasers, and, in particular, to self Q-switching solid-state lasers having diffusing means for increasing the effective volume of the laser rod.

BACKGROUND OF THE INVENTION

A solid-state laser typically comprises a selectively doped glass rod or a material such as Nd:YAG ruby and the like rods. The laser rod is positioned within a suitable pump enclosure including a pair of mirrors or resonators which may be either positioned on the ends of the rod itself or external to it. Generally, the resonators are two parallel flat reflecting surfaces, one of which is totally reflecting at the desired wavelength and the other is partially transmitting at the desired wavelength. However, a number of improvements have been disclosed wherein the laser cavity employs at least one concave or spherical reflector. See, for example, U.S. Pat. Nos. 3,137,827 and 3,253,226. In the latter patent, a pair of spherical resonators are spaced apart a distance differing from their confocal distance to increase the effective path length to several times that of the actual spacing. In U.S. Pat. No. 3,055,257, a confocal cavity is provided to obtain a higher energy density through concentration of the light energy by the cavity than is generally provided by flat parallel resonators. The higher energy density, in turn, reduces the requirements on the pump source. In U.S. Pat. No. 3,365,678, a self Q-switching laser is disclosed utilizing photochromic glass and converging lenses to concentrate radiation upon a localized area of the glass to increase the efficiency thereof.

Generally, a pumping light or flashlamp is employed in solid-state laser systems to raise the atoms in the laser material from the ground state to an excited state. A Q-switched laser uses a rapidly opening optical shutter, such as an electro-optically active material in combination with a polarizer, to suppress laser action until a large population inversion of excited state atoms or ions in the laser rod has been achieved. Some of the atoms return to the ground state spontaneously emitting photons. With the optical shutter closed, the laser losses exceed the laser gain and no amplification of the spontaneous emission occurs. When the shutter is opened, however, the laser gain exceeds the laser losses and a beam of coherent light flashes through the end of the laser rod which is only partially reflecting. The laser light exits as an intense, highly directional, monochromatic beam.

Certain materials, particularly glasses co-doped with neodymium and a bleachable ion such as uranium dioxide, act as self Q-switching or regularly spiking lasers. The pump lamp excites the laser ions, producing an inverted population, and the conditions normally necessary for laser action to occur. At the same time, some of the flashlamp radiation excites the bleachable filter ions, producing an induced absorption which inhibits the lasing action from normally occurring. As pumping continues, the population inversion of the laser ions continues to build up, with a consequent increase in the intensity of the spontaneous emission from these ions. This, in turn, serves to bleach the induced absorption, partially counteracting the effect of the flashlamp. In time, the induced absorption is reduced sufficiently to permit a laser pulse to appear. This pulse is high in amplitude, and very narrow, and resembles a pulse produced by external Q-switching. The pulse partially depletes the population of the excited laser ions, and when this population has fallen below some critical level, laser oscillation stops. During and after this period, the flashlamp continues to pump, eventually restoring both the opacity of the bleachable ion and the population inversion in the laser ion necessary to produce a second pulse. The process than repeats itself, and continues to do so until the flashlamp characteristics fall below some critical conditions.

There is a strong tendency, however, for self Q-switched laser materials to lase over only a small portion of the entire rod volume. Laser rods are fabricated as small as 0.08 inch diameter by 1 inch in length and possibly as large as several inches diameter by 72 inches long; a commonly used rod size is one quarter of an inch in diameter by 3 inches long. When the laser rod is operated utilizing flat resonators, it has been observed that as the rod self Q-switches and releases its pulses of energy, only a small fraction of the rod volume is contributing to an individual energy burst. For example, a small filament in the rod approximately only a millimeter in diameter is actually lasing.

The Q-switched burst of energy occurs as soon as a portion of a Q-switched laser rod becomes transparent between the resonators. Thus, one of the disadvantages of prior art self Q-switched lasers is that only a small filament contributes to the lased energy. Also, self Q-switched lasers often produce a number of randomly spaced spikes of energy.

Accordingly, it is an object of the present invention to overcome the inherent disadvantages of prior art self Q-switched laser by providing a laser rod having a larger effective volume for storing more energy which can be released in a single burst. It is a further object of the invention to obtain a greater energy output for the same energy input by making the entire laser rod function as a unit rather than as individual filaments.

SUMMARY OF THE INVENTION

The present invention provides a solid-state self Q-switched laser including diffusing means for scattering or diverging energy within the laser rod to increase the effective volume contributing to lasing. Preferably, the laser rod is glass co-doped with neodymium and uranium oxide.

Generally, the diffusing means can be incorporated within the laser rod itself in the form of dispersed inclusions, such as crystallines or foreign inclusions, or on the ends of the laser rod. A number of diffusing means on the ends of the laser rod may be provided, including for example, a diffusion coating, controlled etching, or curvilinear resonators. In the latter case, the curvilinear resonators can be positioned externally of the laser rod.

By reason of the diffusion means, the radiation is somewhat scattered or diverged to provide a larger cross-section of uranium oxide which is bleached. The cross section increases in size by the time the giant pulse finally appears in the output. As a result of this increased bleached cross section other regions of the rod which normally remained below threshold are raised to a higher than threshold condition, even as the pulse is being generated. These regions, therefore, begin to contribute to the photon density in the cavity, the net result of which is to make the entire rod dump its energy into the output pulse.

Accordingly, by means of the present invention solid-state self Q-switched lasers are provided with significantly improved efficiency. Moreover, the invention significantly improves the reproducibility of the energy output pulses. Other advantages will become apparent from a perusal of the following detailed description of presently preferred embodiments taken in connection with the accompanying drawings.

BRIEF DESCRIPTION OF THE DRAWINGS

FIG. 1 is a diagrammatic view of a self Q-switched laser rod positioned between a flat and convex resonator;

FIG. 2 is a diagrammatic view of the laser rod of FIG. 1 positioned between a pair of convex resonators;

FIG. 3 is a diagrammatic view of the laser rod of FIG. 1 positioned between a pair of concave resonators; and FIG. 4 is a diagrammatic view of the laser rod of FIG. 1 positioned between a convex and a concave resonator.

PRESENTLY PREFERRED EMBODIMENTS

Figure 1:
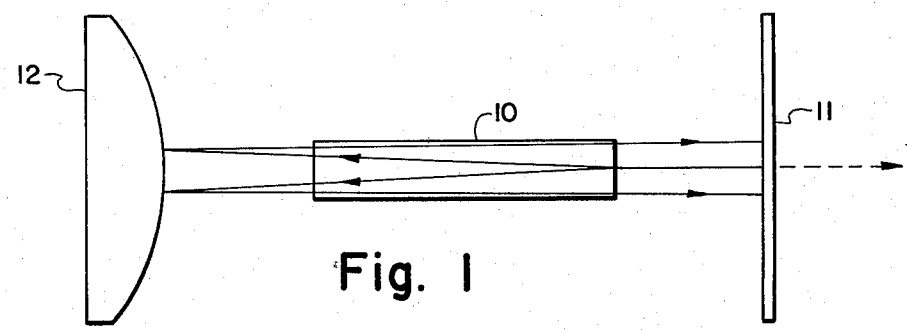
FIGS. 1–4 are alternative embodiments of diffusing means of the present invention in which curvilinear resonators, positioned externally of the laser rod, are used for diffusing or diverging energy reflections. In particular.

The present invention is addressed to self Q-switching lasers and particularly to glass lasers co-doped with neodymium and uranium oxide in which diffusing means are incorporated either internally or externally of the laser rod. In a Nd–UO$_2$-glass rod, the uranium oxide absorbs the emission wavelength of neodymium. The amounts of neodymium and uranium are controlled so that during a portion of the pump pulse neodymium fluoresces and the uranium oxide absorbs and then bleaches to become transparent. When the uranium oxide bleaches, the excess gain is quickly released in a giant energy pulse. Thus, while Nd–UO$_2$-glass rods are preferred, it is clear that the present invention is applicable to other types of self Q-switching lasers which work on colour centers that can be bleached. See, for example, U.S. Pat. No. 3,365,678.

The most direct method of providing the laser with a diffusion means is to incorporate a diffusion medium within the laser rod itself. For example, the diffusion can be achieved by precipitating finely dispersed inclusions such as crystallites or foreign inclusions within the rod. Foreign inclusions may be platinum, aluminum or ceramic material from the crucible in which the glass is melted, or silicon that is not completely homogenized in the glass.

In manufacturing glass for lasers, methods are conventionally used to eliminate the precipitates to provide a completely homogeneous glass structure. However, in accordance with the present invention, precipitates are desired. These precipitates or inclusions force the laser rod to become optically more homogeneous causing the entire rod to act as a unit rather than as individual filaments.

Accordingly, when the laser is above threshold, it will tend to oscillate in a single filament. However, the uranium oxide is bleached with a cross section greater than the filamental size because of the scattering caused by the diffusion means. Thus, the cross section increases in size or bleaches other regions of the rod which initially were just below threshold raising them to an above threshold condition while the pulse is being generated. This in turn contributes to the photon density of the cavity causing a still greater cross-sectional area of the uranium oxide to bleach. The net result is to tend to make the entire volume of the rod dump its energy into the output pulse.

Another method of providing the laser with diffusion means is to controllably etch one or both ends of the rod. A uniform pit or scratch size is provided on the ends of the rod by a conventional acid, for example hydrochloric acid, process or polishing procedure. Thus, the etch or polishing technique is selected to diffuse the particular wavelength of light desired which would increase the effective volume of the rod absorbing energy as set forth above.

Similarly, a diffusion coating may be applied to one or both ends of the laser rod. A number of dielectric coatings can be used which are sputtered onto the ends of the rod in a manner that makes them microscopically "rough". Particularly well-suited for this purpose are materials such as magnesium fluoride and zinc sulfide which are good transmitting coatings.

Preferably, the diffusion etching or polishing or diffusion coating is used where the laser is designed for very high peak power. In very high peak power lasers utilizing metallic inclusions as the diffusing means, there is a possibility that damage to the rod could occur. This damage may be, for example, a microscopic crack which would provide a nonuniform diffusion. Accordingly, for very high peak power lasers, the diffusion means are preferably provided to the outer end surfaces of the rod or external to the system.

An alternative diffusion means is to provide at least one of the laser resonators with a curvature. This embodiment is desirable where a diffusion coating is subject to damage. Thus, with reference to FIGS. 1–4, a number of various curved resonators or mirrors are shown, externally of the laser rod, which cause the rays undergoing a reflection to diverge into the interior of the rod 10 exciting a larger volume. Thus, FIGS. 1–4 are illustrative of only a few of the configurations and combinations possible. Moreover, it is clear that while the mirrors are shown externally to the laser rod, the ends of the rod may be ground to the same curvatures and coated with a multilayer dielectric coating that is reflective at the desired wavelength.

Referring to FIG. 1 in particular, self Q-switching laser rod 10 is disposed between external flat resonator 11 and external convex resonator 12. This causes a ray in the rod undergoing a reflection to diverge into the interior of the rod thus exciting a larger volume of the rod. The arrowed lines shown in FIG. 1 are illustrative of the diffusion pattern which is set up within the self Q-switching laser rod by the external resonators. The reflection into the laser rod 10 excites a larger volume of the laser rod 10 before self Q-switching occurs.

Figure 2:
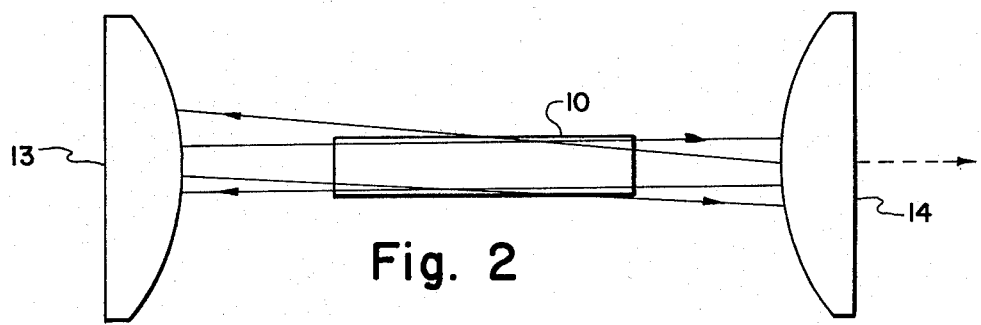

As shown in FIG. 2, two convex resonators, 13 and 14, can be used to achieve diffusion within the self Q-switching laser rod 10. The arrowed lines shown in FIG. 2 are illustrative of the diffusion pattern which is set up within the self Q-switching laser rod 10 by the external convex resonators, 13 and 14.

Figure 3:
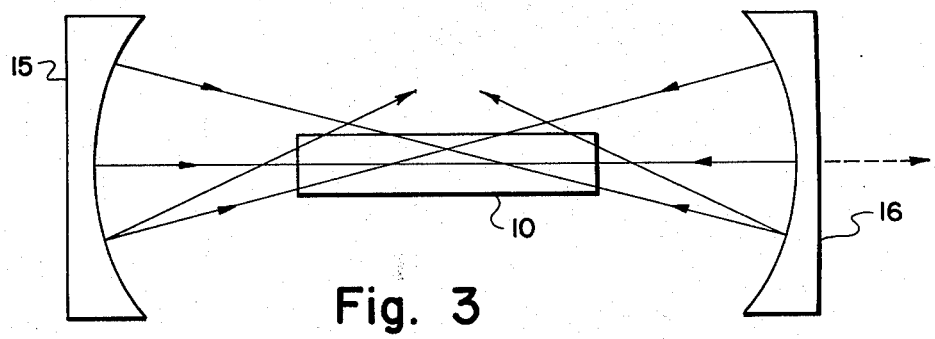

Referring to FIG. 3, two concave resonators, 15 and 16, are positioned external to the ends of laser rod 10. The diffusion pattern set up within laser rod 10 is illustrated by the arrowed lines of FIG. 3. A light beam is reflected within laser rod 10 causing the ray undergoing reflection to diverge into the interior of the rod thus exciting a larger volume of the rod in the same manner as the configurations shown in FIGS. 1 and 2.

Figure 4:
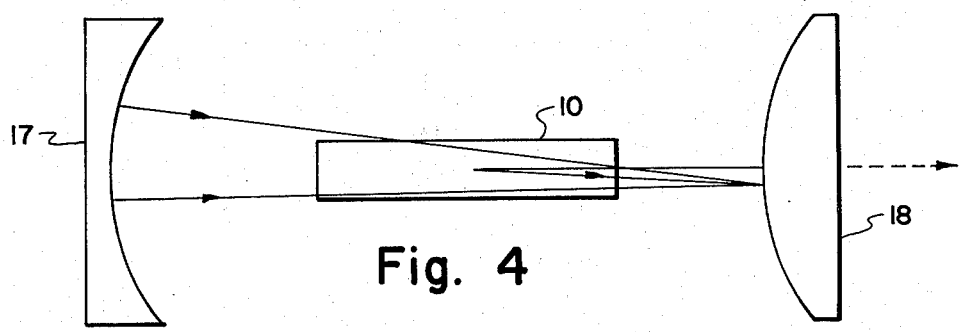

Referring to FIG. 4, external concave resonator 17 is shown at one end of laser rod 10 and external convex resonator 18 is shown at the other end. The diffusion pattern within laser rod 10 is shown by the arrowed lines of FIG. 4.

It is thus seen that the diffusion means of the present invention can be provided in a number of different ways. Accordingly, while present preferred embodiments of the invention have been shown and described in particularity, the invention may be otherwise embodied within the scope of the appended claims.

What is claimed is:

1. In a self Q-switched solid state laser oscillator system in which the intracavity laser beam is in the form of a small cross sectional area beam, said oscillator comprising a pair of resonator elements, the improvement comprising a diffusing means for scattering-/diverging the intracavity laser energy to increase the effective volume of the laser rod which is self Q-switched and, thereby, contributing to laser emission.

2. In a laser system including a self Q-switching solid-state laser rod and a pair of resonators in combination therewith, one of said resonators being partially transmitting at the desired wavelength, the improvement comprising a diffusing means for increasing the effective volume of said laser rod said diffusing means comprises finely divided inclusions within said laser rod.

3. In a laser system including a self Q-switching solid-state laser rod and a pair of resonators in combination therewith, one of said resonators being partially transmitting at the desired wavelength, the improvement comprising a diffusing means for increasing the effective volume of said laser rod said diffusing means comprises a uniform etch on at least one end of said laser rod.

4. In a laser system including a self Q-switching solid-state laser rod and a pair of resonators in combination therewith, one of said resonators being partially transmitting at the desired wavelength, the improvement comprising a diffusing means for increasing the effective volume of said laser rod said diffusing means comprises diffusing coating on at least one end of said laser rod, said coating being transparent at the lasing wavelength.

5. The improvement as set forth in claim 1 wherein said diffusing means comprises a curvilinear surface on one of said resonators.

6. The improvement as set forth in claim 1 wherein said laser rod comprises $Nd-UO_2$-glass.

7. The improvement as set forth in claim 5 wherein said curvilinear surface is at least one selected from the group consisting of a concave and a convex surface.

8. In a self Q-switched $Nd-UO_2$-glass laser oscillator system in which the intracavity laser beam is in the form of a small cross sectional area beam, said oscillator comprising a pair of resonator elements, the improvement comprising a diffusing means for scattering-/diverging the intracavity laser energy to increase the effective volume of the laser rod which is self Q-switched and, thereby, contributing to laser emission.

9. In a laser system including a self Q-switching $Nd-UO_2$-glass laser rod and a pair of resonators, in combination therewith, one of said resonators being partially transmitting at the desired wavelength, the improvement comprising a diffusing means for increasing the effective volume of said laser rod said diffusing means comprises finely divided inclusions uniformly precipitated within said laser rod.

10. In a laser system including a self Q-switching $Nd-UO_2$-glass laser rod and a pair of resonators, in combination therewith, one of said resonators being partially transmitting at the desired wavelength, the improvement comprising a diffusing means for increasing the effective volume of said laser rod said diffusing means comprises a uniform etch on at least one end of said laser rod.

11. In a laser system including a self Q-switching $Nd-UO_2$-glass laser rod and a pair of resonators, in combination therewith, one of said resonators being partially transmitting at the desired wavelength, the improvement comprising a diffusing means for increasing the effective volume of said laser rod said diffusing means comprises a dielectric coating on one end of said laser rod, said coating being microscopically rough and transparent at the lasing wavelength.

12. The improvement as set forth in claim 8 wherein said diffusing means comprises a curvilinear surface on at least one of said resonators, said surface being at least one selected from the group consisting of a concave and a convex surface.

* * * * *